United States Patent
Tanaya

(10) Patent No.: US 7,779,789 B2
(45) Date of Patent: Aug. 24, 2010

(54) DOG WALKING BELT FOR DOG HAVING HABIT OF PULLING OWNER

(76) Inventor: Satoru Tanaya, 29-1, Aza Kitahara, Nagaoka, Iwanuma-shi, Miyagi, 989-2461 (JP)

( * ) Notice: Subject to any disclaimer, the term of this patent is extended or adjusted under 35 U.S.C. 154(b) by 112 days.

(21) Appl. No.: 12/087,992

(22) PCT Filed: Nov. 15, 2006

(86) PCT No.: PCT/JP2006/322704

§ 371 (c)(1), (2), (4) Date: Oct. 23, 2008

(87) PCT Pub. No.: WO2007/102258

PCT Pub. Date: Sep. 13, 2007

(65) Prior Publication Data

US 2009/0301404 A1   Dec. 10, 2009

(30) Foreign Application Priority Data

Mar. 8, 2006   (JP) .............................. 2006-062354

(51) Int. Cl.
*B60R 22/00* (2006.01)
(52) U.S. Cl. ..................................... 119/770
(58) Field of Classification Search ................. 119/769, 119/770, 772, 774, 495, 797, 856, 858, 864, 119/771; 182/3, 4, 7; 54/71; 224/158, 184
See application file for complete search history.

(56) References Cited

U.S. PATENT DOCUMENTS

| | | | | |
|---|---|---|---|---|
| 2,212,746 A | * | 8/1940 | Nunn | ........................... 119/770 |
| 3,769,938 A | * | 11/1973 | Hudziak et al. | ............. 128/874 |
| 4,396,091 A | * | 8/1983 | Anderson | ....................... 182/3 |
| 5,161,486 A | * | 11/1992 | Brown | ......................... 119/795 |
| 5,174,410 A | * | 12/1992 | Casebolt | ......................... 182/3 |
| 5,183,007 A | * | 2/1993 | Vincent | ....................... 119/770 |
| 6,273,029 B1 | * | 8/2001 | Gish | .......................... 119/792 |

(Continued)

FOREIGN PATENT DOCUMENTS

JP   U-3032080   12/1996

(Continued)

*Primary Examiner*—Thomas Price
(74) *Attorney, Agent, or Firm*—Oliff & Berridge, PLC

(57) ABSTRACT

A dog walking belt for a dog having a habit of pulling an owner of the present invention is so configured that: a waist belt 2 is inserted with a lower-back support pad 1 at a back of a lower back to protect the lower back from a pulling force of a dog 200, a hook holder 3 is assembled at a front of the waist belt 2 to move freely thereby not to disrupt the balance of a body resulting from a sudden pulling force of the dog 200 in a right and left direction, and a pulling supporting point from a main lead 8 is placed at about 12 cm at a front of a lower back of the hook holder 3 so that a force is equally dispersed to the waist belt 2 and a shoulder belt 6, whereby the pulling force of the dog 200 can be received by an entire body. The main lead 8 is coupled with a lead buffering spring 11 to alleviate rocking of the pulling force of the dog 200, alleviating a load applied to the walking person 100.

5 Claims, 2 Drawing Sheets

U.S. PATENT DOCUMENTS

| | | | |
|---|---|---|---|
| 6,450,129 B1 * | 9/2002 | Flynn | 119/770 |
| 6,761,019 B2 * | 7/2004 | Earnhart | 54/23 |
| 7,051,836 B2 * | 5/2006 | Green | 182/7 |
| 7,163,081 B2 * | 1/2007 | Muhich | 182/3 |
| 7,467,604 B1 * | 12/2008 | Werner et al. | 119/770 |

FOREIGN PATENT DOCUMENTS

| | | |
|---|---|---|
| JP | U-3080601 | 10/2001 |
| JP | A-2004-254678 | 9/2004 |
| JP | B1-3599735 | 9/2004 |

\* cited by examiner

DOG WALKING BELT FOR DOG HAVING HABIT OF PULLING OWNER

BACKGROUND OF THE INVENTION

1. Field of the Invention

The present invention relates to a dog walking belt for a dog having a habit of pulling an owner, fitted to a human to cope with a dog having a habit of pulling an owner when walking a dog, the dog walking belt for a dog having a habit of pulling an owner being configured by: a waist belt; a lower-back support pad; a hook holder; a lead-attaching hook; a shoulder belt; a main lead; a control lead hand; a control lead; a lead buffering spring; and a lead buffering spring stopper.

2. Description of the Related Art

Conventionally, various types of dog walking belts have been devised to alleviate a burden of a person walking a dog.

A leash attached belt for walking a pet animal disclosed in Japanese Patent No. 3599735 (hereinafter, referred to as Patent Document 1) is so configured to disperse an impulse force generated by a sudden action, etc., when walking a pet animal such as a dog, so that there is no hurt to an arm, a shoulder, etc., shoulder stiffness or a cramp is not brought on, and a human is not injured by falling.

Patent Document 1: Japanese Patent Publication No. 3599735

SUMMARY OF THE INVENTION

However, the above-described leash attached belt for walking a pet animal in the Patent Document 1 provides no countermeasures against the dog having a habit of pulling an owner. The leash attached belt is made by combining a waist belt and a shoulder belt. However, the waist belt is thin as a whole, and thus, when the owner takes a walk and is pulled by the dog having a habit of pulling an owner, for a long period, the waist belt bites into the waist of a walking person to apply a load to the walking person, which results in a lower back pain.

With respect to the shoulder belt, the waist belt and the shoulder belt are joined by being sewed to each other at the front, and connected by a length adjusting member at the back. However, with this configuration, a connection supporting point with a lead is directly placed at the waist belt, and thus, the pulling force of the dog having a habit of pulling an owner is applied only to the waist belt and is not dispersed to the shoulder belt at all.

A lead attaching portion is directly sewed to and fixed at the waist belt, and thus, when the dog makes a sudden movement in a right and left direction, the waist belt as such is twisted, causing an instability to the body of the walking person.

The lead sewed in the waist belt is directly coupled to a collar of the dog by a lead hook, and thus, rocking of the dog's pulling force during a long walking time is transmitted to the dog walking belt, resulting in a burden to a lower back of the walking person.

An object of the present invention is to provide a dog walking belt for a dog having a habit of pulling an owner, capable of solving the above-described problem inherent in walking such a dog having a habit of pulling an owner.

A dog walking belt for a dog having a habit of pulling an owner of the present invention which achieves the above-described object is equipped with a detachable length-adjustable waist belt of a loop-shaped member, and a rhombus-shaped lower-back support pad is inserted and assembled at a back of the waist belt, thereby protecting a lower back of a person fitted with the belt from a pulling force of a dog having a habit of pulling an owner. The rhombus-shaped lower-back support pad is formed with many ventilation holes to solve the problem that the body of the walking person gets sweaty in summer and to make the lower-back support pad light.

A hook holder made of leather is assembled at a front of the waist belt to move freely, and a length from the waist belt to a tip end hook of the hook holder is set to about 12 cm, thereby connecting a lead-attaching hook of a gourd-shaped metal fitting. Further, the lead-attaching hook is set with the shoulder attaching ring of a ring-shaped wire member, and by means of detachable hooks at both tip ends of the length-adjustable shoulder belt of a loop-shaped member, the shoulder belt is connected to the shoulder attaching ring of a ring-shaped wire member.

The lead-attaching hook of a gourd-shaped metal fitting attached to the hook holder made of leather is attached with one end of the main lead, and the other end thereof on a dog's collar side is attached with the lead buffering spring. The lead buffering spring contains the lead buffering spring stopper.

In parallel with the main lead, the lead-attaching hook of a gourd-shaped metal fitting is coupled with the control lead hand. Further, the hook of the other end of the control lead hand is connected with the control lead, and the other end of the control lead is coupled with the buffering spring hook. The control lead is directly coupled to the buffering spring hook, without intervention of the main lead and the lead buffering spring, and then, connected to the collar of the dog.

The dog walking belt for a dog having a habit of pulling an owner of the present invention is thus configured. Thus, when walking a dog, even when a dog's owner is pulled by the dog having a habit of pulling an owner for a long time, the force is equally dispersed to the waist belt attached with the lower-back support pad and the shoulder belt, and as a result, a load applied to the body of the walking person is removed. Therefore, walking the dog having a habit of pulling an owner, which is estimated to exist nationwide in large numbers, can be easily performed, and further, when walking the dog, the walking person is pulled by the dog having a habit of pulling an owner, and thereby, walking of the walking person himself/herself also becomes easy, which is a secondary effect.

When the dog walking belt for a dog having a habit of pulling an owner is thus used, a comfortable walking is enabled. This results in establishment of a good relationship between an owner's dog and its owner, and also serves to assist physical and mental health for both the dog and the owner.

As described above, the present invention is a dog walking belt to cope with a dog having a habit of pulling an owner. When walking a dog having a habit of pulling an owner, an arm, a shoulder, etc., of the owner are not hurt, unlike when walking while holding a lead. A pulling force of the dog having a habit of pulling an owner is equally dispersed by a waist belt attached with a lower-back support pad and a shoulder belt. As a result, unlike in the conventional dog walking belt, a lower back of the walking person is not hurt any more. Alternatively, walking the dog having a habit of pulling an owner excessively imposes a physical burden on the owner. As a result, the owner starts feeling reluctant of walking with the dog, and this creates a worst environment where the dog is kept while being chained at home. This can be unhappy both for the dog and the owner. To solve such problems, the dog walking belt for a dog having a habit of pulling an owner serves as effective means.

DETAILED DESCRIPTION

Hereinafter, with reference to drawings, an embodiment of the present invention is described.

FIG. 1 is a perspective view showing a dog walking belt for a dog having a habit of pulling an owner according to the embodiment of the present invention.

As shown in FIG. 1, the dog walking belt for a dog having a habit of pulling an owner is provided with: a lower-back support pad 1 of a rhombus-shaped member, the lower-back support pad being inserted into a waist belt 2 of a loop-shaped member; a main lead 8 coupled to a shoulder belt 6 of a loop-shaped member and a lead-attaching hook 4 of a gourd-shaped metal fitting; a control lead hand 9 coupled to the lead-attaching hook 4; a control lead 9B (attached in parallel with the main lead 8) tying the control lead hand 9; a lead buffering spring 11; and a lead buffering spring stopper 11A contained in the lead buffering spring 11.

For a member for forming the dog walking belt for a dog having a habit of pulling an owner, the waist belt 2 of a loop-shaped member includes a buckle 2A for adjusting a length to match a size of a waist of a walking person 100. At a back of the waist belt 2, the lower-back support pad 1 of a rhombus-shaped member is so equipped that two locations each at both ends of a pad surface are cut vertically to form holes, into which the waist belt 2 is inserted. A surface of the lower-back support pad 1 is formed with about 53 pieces of holes 1A, in a horizontal column, each having a diameter of 1 cm to achieve good air permeability to a body and light weight.

A hook holder 3, made of leather, attached to the front of the waist belt 2 has a ring-shaped joint, into which the waist belt 2 is inserted so that it is attached to move freely. A length from the waist belt 2 to a tip end of the hook holder 3 is about 12 cm. A hook 3A at the tip end of the hook holder 3 made of leather is joined to the lead-attaching hook 4 of a gourd-shaped metal fitting. A shoulder-belt attaching ring 5 of a ring-shaped wire member is further set to the lead-attaching hook 4 of a gourd-shaped metal fitting. The shoulder-belt attaching ring 5 is connected with the shoulder belt 6 of a loop-shaped member by detachable shoulder-belt hooks 6C arranged at both ends of the shoulder belt 6. The shoulder belt 6 is equipped with a buckle 6B of which the length can be adjusted to match the body of the walking person 100, and inserted therein with a shoulder-belt pad 6A set to a contacting portion of a shoulder of the walking person 100.

One end of the main lead 8, which ties the dog walking belt for a dog having a habit of pulling an owner and a collar of a dog having a habit of pulling an owner 200, is coupled to the lead-attaching hook 4 of a gourd-shaped metal fitting. The other end of the main lead 8 is coupled to the lead buffering spring 11. One end of the control lead hand 9 is coupled to the lead-attaching hook 4 of a gourd-shaped metal fitting, and the other end thereof is coupled to one end of the control lead 9B to be attached in parallel with the main lead 8. The other end of the control lead 9B passes through a control-lead-guide metal fitting 10 attached to the main lead 8 and then a ring portion of a main lead hook 8A to be attached to a buffering spring hook 12. The lead buffering spring 11 coupled to the main lead 8 contains the lead buffering spring stopper 11A, and is tied to the collar of the dog having a habit of pulling an owner 200 by the buffering spring hook 12.

To the waist belt, a mobile telephone holder 7, a pedometer (registered mark) 7A, a pouch 7B having therein a set of tools for treatment of dog's dropping are additionally set.

FIG. 2 is a perspective view showing a state where the walking person 100, equipped with the dog walking belt for a dog having a habit of pulling an owner according to the embodiment of the present invention, walks while being pulled by the dog having a habit of pulling an owner 200.

To fit the dog walking belt for a dog having a habit of pulling an owner shown in FIG. 1 to the body of the walking person 100, a length of the waist belt 2 of a loop-shaped member is adjusted by the buckle 2A to match the size of the waist; the hook holder 3 made of leather is attached to a front of the waist; and the waist belt 2 having the rhombus-shaped lower-back support pad 1 attached at a back thereof is fitted around the waist of the walking person 100, as shown in FIG. 2.

The hook holder 3, made of leather, attached at a front of the waist belt 2 is connected with the lead-attaching hook 4 of a gourd-shaped metal fitting, and the lead-attaching hook 4 is attached with the shoulder-belt attaching ring 5 of a ring-shaped wire member. Further, the shoulder-belt attaching ring 5 is connected with one end of the detachable shoulder-belt hook 6C, a shoulder portion of the body of the walking person 100 is draped with the shoulder belt 6 of a loop-shaped member from above, and the other end of the detachable shoulder-belt hook 6C is connected to the shoulder-belt attaching ring 5 of a ring-shaped wire member from a lower left waist. The shoulder belt 6 of a loop-shaped member can be adjusted to match the body by the buckle 6B.

The lead-attaching hook 4 of a gourd-shaped metal fitting is coupled with one end of the main lead 8, and the other end of the main lead 8 is attached, via the main lead hook 8A of a metal fitting, with the lead buffering spring 11. The lead buffering spring 11 contains the lead buffering spring stopper 11A. Further, the other tip end of the lead buffering spring 11 is set with the buffering spring hook 12 of a metal fitting. By means of the buffering spring hook 12, the main lead 8 is coupled to the collar of the dog having a habit of pulling an owner 200.

The lead-attaching hook 4 of a gourd-shaped metal fitting is coupled with one end of the control lead hand 9 as a gripping portion. The other end of the control lead hand 9 has a control-lead-hand hook 9A of a metal fitting. One end of the control lead 9B is coupled to the control-lead-hand hook 9A. The other end of the control lead 9B also has a control lead hook 9C of a metal fitting. The control lead hook 9C is joined to the buffering spring hook 12, which is tied to the collar of the dog having a habit of pulling an owner 200. This permits control of the dog having a habit of pulling an owner 200 by the control lead 9B without intervention of the lead buffering spring 11 of the main lead 8. The control lead 9B passes through the control-lead-guide metal fitting 10 which is attached at a midway of the main lead 8, passes through a ring-shaped root portion of the main lead hook 8A of a metal fitting, and is connected to the buffering spring hook 12 in parallel with the main lead 8. The buffering spring hook 12 is tied to the collar of the dog having a habit of pulling an owner 200.

FIG. 3 is an enlarged perspective view of a portion of the hook holder 3 in a state where the walking person 100 is equipped with the dog walking belt for a dog having a habit of pulling an owner according to the embodiment of the present invention.

As shown in FIG. 2, there is shown a case where the walking person 100 walks with the dog having a habit of pulling an owner 200 using the dog walking belt for a dog having a habit of pulling an owner. In order that the pulling force of the dog having a habit of pulling an owner 200 is dispersed to the waist belt 2 of a loop-shaped member and the shoulder belt 6 of a ring-shaped member, the hook holder 3 made of leather is attached at a front of the waist belt 2. The length from an attaching position of the hook holder 3 to a tip end position thereof is set to about 12 cm and the supporting point of the pulling force is placed forwardly. Thereby, the pulling force is equally dispersed to the waist belt 2 of a loop-shaped member and the shoulder belt 6 of a ring-shaped-.member attached to the body of the walking person 100.

FIG. 4 is a perspective view of the lead buffering spring 11 attached to the tip end of the main lead 8 connected to the dog walking belt for a dog having a habit of pulling an owner according to the embodiment of the present invention, and the lead buffering spring stopper 11A and the buffering spring hook 12 contained in the lead buffering spring 11.

As shown in FIG. 2, when the walking person 100 walks using the dog walking belt for a dog having a habit of pulling an owner, in order that the rocking of the pulling force of the dog having a habit of pulling an owner 200 is not applied to the walking person 100, the lead buffering spring 11 is set between the main lead 8 and the collar of the dog having a habit of pulling an owner 200. The lead buffering spring 11 further contains the lead buffering spring stopper 11A. The lead buffering spring stopper 11A is so configured that: two steel wires are combined; one tip end of one steel wire is formed into a ring shape and bent by 90 degrees; the other tip end of the other steel wire is similarly formed in a ring shape and bent by 90 degrees; the tip ends of the steel wires are alternatively passed through the rings of the tip ends; the thus made component is contained in the lead buffering spring 11; the both tip ends of the right and left steel wires are formed in a ring having the same size as that of a spring attached ring portion; and the resultant component is attached inside the lead buffering spring 11.

When the dog walking belt for a dog having a habit of pulling an owner is fitted to the walking person 100, the pulling force for a long period of the dog having a habit of pulling an owner 200 during walking is dispersed to the waist belt 2 of a loop-shaped member and the shoulder belt 6 of a ring-shaped member, as shown in FIG. 2, by the following methods. Thereby, a load applied to the body of the walking person 100 can be alleviated.

At a back of the waist belt 2 of a loop-shaped member, the rhombus-shaped lower-back support pad 1 is inserted. This component serves to prevent a lower back pain from occurring resulting from the pulling force of the dog having a habit of pulling an owner 200 being applied to the waist belt 2 and being bitten into the lower back of the walking person 100.

As shown in FIG. 3, at a front of the waist belt 2 of a loop-shaped member, the hook holder 3 made of leather is inserted and set; a tip-end metal fitting hook 3A of the hook holder 3 is connected with the lead-attaching hook 4 of a gourd-shaped metal fitting; and the shoulder-belt attaching ring 5 of a ring-shaped wire member is further set, thereby coupling the shoulder belt 6 of a loop-shaped member at a location (about 12 cm forwardly apart from the waist belt 2). As a result, the force of the dog having a habit of pulling an owner 200 is equally dispersed to the waist belt 2 of a loop-shaped member and the shoulder belt 6 of a ring-shaped member.

The hook holder 3 made of leather is set to move freely forwardly of the waist belt 2 of a loop-shaped member, and thus, even when the dog having a habit of pulling an owner 200 suddenly pulls the walking person 100 in a right or left direction, the hook holder 3 made of leather moves in a right or left direction to absorb a shock, thereby preventing the walking person 100 from falling on a ground.

Via the hook holder 3 made of leather, the lead-attaching hook 4 of a gourd-shaped metal fitting is coupled with one end of the main lead 8. The other end of the main lead 8 is attached with the lead buffering spring 11. The lead buffering spring 11 softens the rocking of the force of the dog having a habit of pulling an owner 200 to alleviate a load applied to the waist belt 2 of a loop-shaped member and the shoulder belt 6 of a ring-shaped member fitted to the body of the walking person 100.

The lead buffering spring 11 contains the lead buffering spring stopper 11A so that the lead buffering spring 11 is not fully extended by the sudden pulling force of the dog having a habit of pulling an owner 200. In the lead buffering spring stopper 11A set in the lead buffering spring, the lead buffering spring 11 is pulled to be extended, and thereby, the pulling force is weakened, and at the same time, the force applied to the lead buffering spring stopper 11A also is weakened. As a result, even when the steel wire is used, a sufficient strength can be maintained.

The lead-attaching hook 4 of a gourd-shaped metal fitting is coupled with one end of the control lead hand 9 in parallel with the main lead 8. The other end thereof is coupled to the control lead 9B, thereby coupling to the collar of the dog having a habit of pulling an owner 200 via the buffering spring hook 12 of a metal fitting. The control lead hand 9 is formed in a ring shape to be easily gripped by a hand in order to control the dog having a habit of pulling an owner 200. When the walking person 100 uses the main lead 8 to attempt to control the dog having a habit of pulling an owner 200, the lead buffering spring 11 is applied a sudden load, which may result in a full extension of the lead buffering spring 11. To prevent this, the control lead 9B is used to control the dog having a habit of pulling an owner 200. When the two leads, i.e., the main lead 8 and the control lead 9B, are used in parallel, the strength is increased and the main lead 8 which is thin and light can be used.

An object of the dog walking belt for a dog having a habit of pulling an owner is to comfort walking with the dog having a habit of pulling an owner by alleviating the load of the walking person 100 from the pulling force for a long time of the dog having a habit of pulling an owner 200 during walking. Further, taking out the dog having a habit of pulling an owner 200 which remains chained at home, for a walk, is enabled, thereby establishing a good relationship between an owner's dog and its owner. As a result, physical and mental health for both the dog and the owner can be obtained. When the walking person 100 is pulled by the pulling force of the dog, i.e., a biggest shortcoming of the dog having a habit of pulling an owner 200, thereby resulting in a secondary factor which enables an easy walking for the walking person 100. When the dog walking belt is used, both hands become available, which also enables a walking intended to aim for good health of the walking person 100 himself/herself. When the pad 1 supporting the lower back continuously pulls the body, also an effect for correcting a gesture of the body of the walking person 100 is provided.

Various dog walking belts have been proposed in the past. However, because of various problems, these proposals have not become generally used.

It is highly probable that the present invention will become widely used in general households which keep a dog having a habit of pulling an owner and which have a problem of walking a dog because walking a dog is very troublesome when being pulled by the dog while walking. It is also probable that the present invention will become widely used by persons who want to practice walking for their health but feel embarrassed, and thus, use the walking a dog as a reason to justify the walking. Most of connecting portions of the dog walking belt for a dog having a habit of pulling an owner are formed of a metal-fitting system, and thus, a configuration thereof is simple and a producing cost is low, enabling provision of the dog walking belt at a low price. Thereby, purchasing the dog walking belt at a reasonable price is enabled, probably leading to wide use.

EXPLANATION OF LETTERS AND NUMERALS

Figure 1:
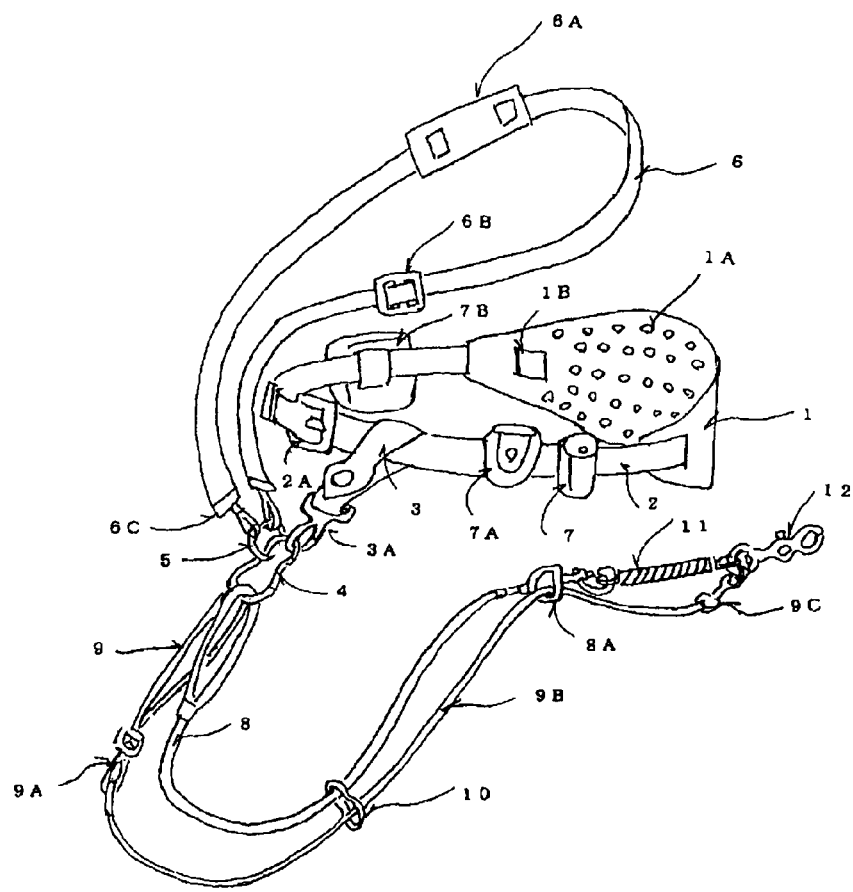
FIG. 1 is an external perspective view showing a dog walking belt for a dog having a habit of pulling an owner, according to an embodiment of the present invention.
Figure 2:
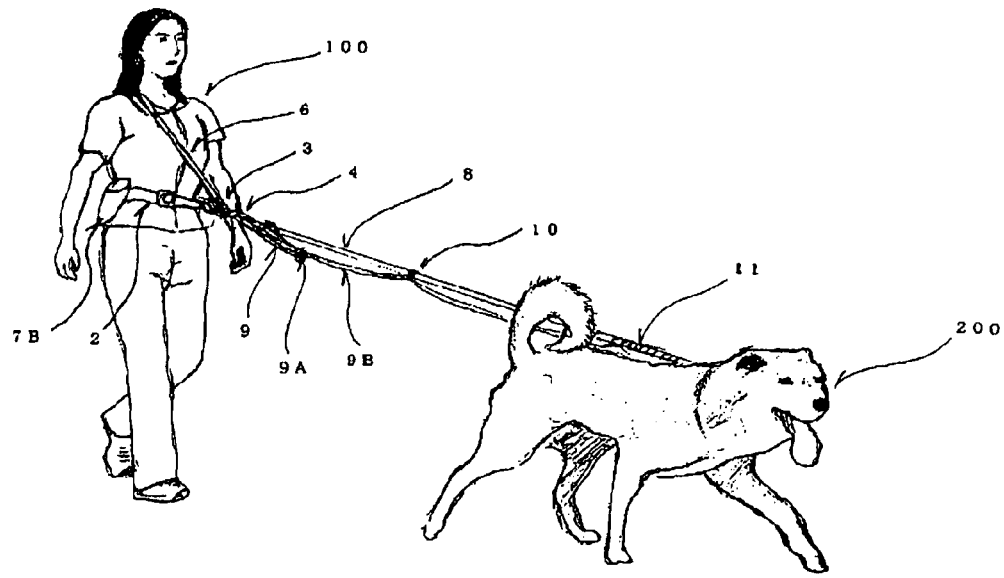
FIG. 2 is a perspective view showing a state where a walking person, fitted with the dog walking belt for a dog having a habit of pulling an owner according to the embodiment of the present invention, walks while being pulled by a dog having a habit of pulling an owner.
Figure 3:
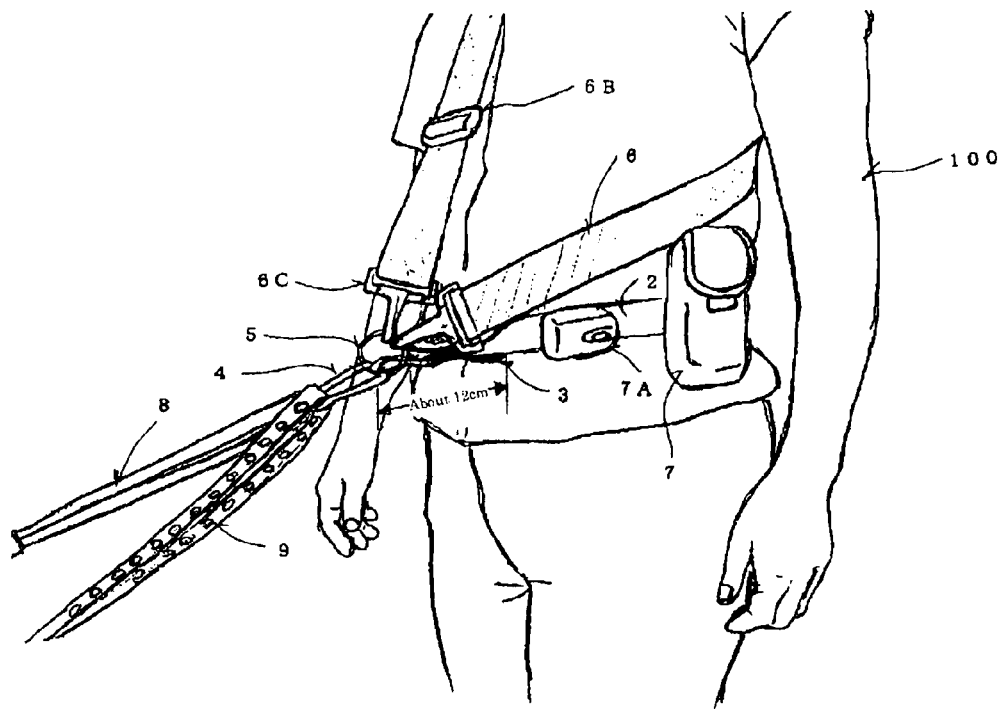
FIG. 3 is an enlarged perspective view of a hook holder portion in a state where the walking person is fitted with the dog walking belt for a dog having a habit of pulling an owner according to the embodiment of the present invention.
Figure 4:
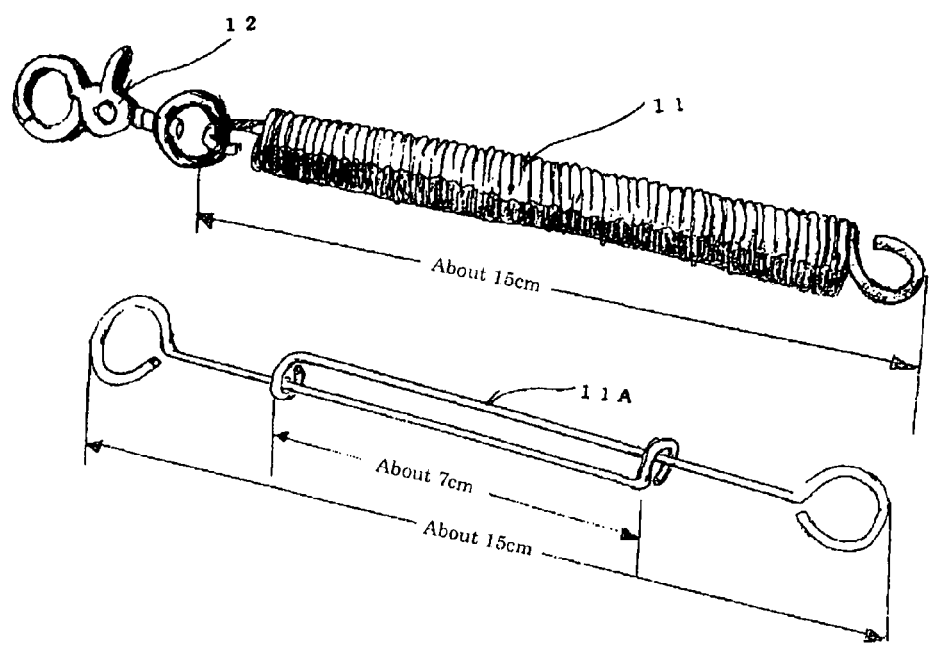
FIG. 4 is a perspective view of a lead buffering spring attached to a tip end of a lead portion connected to the dog walking belt for a dog having a habit of pulling an owner according to an embodiment of the present invention, and a lead buffering spring stopper and a lead-attaching hook contained in the lead buffering spring.

1: Lower-back support pad
1A: Lower-back support pad lightweight holes or ventilation holes
1B: Waist belt attachment cut opening
2: Waist belt
2A: Buckle
3: Hook holder
3A: Hook
4: Lead-attaching hook
5: Shoulder-belt attaching ring
6: Shoulder-belt
6A: Shoulder-belt pad
6B: Buckle
6C: Shoulder-belt hook
7: Mobile telephone holder
7A: Pedometer
7B: Pouch for set of tools for treatment of dog's dropping
8: Main lead
8A: Main lead hook
9: Control lead hand
9A: Control lead hand hook
9B: Control lead
9C: Control lead hook
10: Control-lead-guide metal fitting
11: Lead buffering spring
11A: Lead buffering spring stopper
12: Buffering spring hook
100: Walking person
200: Dog having a habit of pulling an owner

What is claimed is:

1. A dog walking belt for a dog having a habit of pulling an owner, comprising:

a lower-back support pad formed in a rhombus shape, the lower-back support pad being inserted and assembled at a back of a length-adjustable waist belt formed in a loop shape;

a hook holder made of leather, the hook holder being inserted at a front of the waist belt;

a lead-attaching hook of a gourd-shaped metal fitting, the lead-attaching hook being coupled to a hook of a tip end of the hook holder;

a shoulder attaching ring of a ring-shaped wire member, the shoulder attaching ring being set to the lead-attaching hook; and detachable hooks arranged at both ends of a length-adjustable shoulder belt formed of a loop-shaped member, the detachable hooks being connected and assembled to the shoulder attaching ring of a ring-shaped wire member.

2. The dog walking belt for a dog having a habit of pulling an owner according to claim 1, wherein the dog walking belt is so configured that at a front of the length-adjustable waist belt of a loop-shaped member, the hook holder made of leather, said hook holder being able to move freely and attached to soften an impact, even when being pulled suddenly in a right and left direction by the dog having a habit of pulling an owner, and the tip end of the hook holder are positioned at about 12 cm forwardly from the waist belt, and thereby, a lead attaching supporting point is placed forwardly, whereby a pulling force of the dog having a habit of pulling an owner can be equally dispersed to the waist belt and the shoulder belt.

3. The dog walking belt for a dog having a habit of pulling an owner according to claim 1, wherein the dog walking belt is so configured such that one end of a main lead which ties a belt portion attached to a walking person and the dog having a habit of pulling an owner is connected to the lead-attaching hook of a gourd-shaped metal fitting connected to the hook holder made of leather, the other end of the main lead is connected to a lead buffering spring for buffering rocking of a pulling force of the dog, in parallel with the main lead, the lead-attaching hook of a gourd-shaped metal fitting is connected with an end of a control lead hand coupled to a control lead, and the other end of the control lead is coupled to a buffering spring hook, whereby when controlling the dog having a habit of pulling an owner, without intervention of the main lead and the lead buffering spring, the control lead hand coupled to the control lead is used, and thereby, without applying a sudden force to the lead buffering spring, the spring is not fully extended.

4. The dog walking belt for a dog having a habit of pulling an owner according to claim 3, wherein the dog walking belt is so configured that the lead buffering spring is provided to buffer the rocking of the pulling force of the dog, and the lead buffering spring further contains a lead buffering spring stopper so that the lead buffering spring is not fully extended by the pulling force of the dog.

5. The dog walking belt for a dog having a habit of pulling an owner according to claim 2, wherein the dog walking belt is so configured such that one end of a main lead which ties a belt portion attached to a walking person and the dog having a habit of pulling an owner is connected to the lead-attaching hook of a gourd-shaped metal fitting connected to the hook holder made of leather, the other end of the main lead is connected to a lead buffering spring for buffering rocking of a pulling force of the dog, in parallel with the main lead, the lead-attaching hook of a gourd-shaped metal fitting is connected with an end of a control lead hand coupled to a control lead, and the other end of the control lead is coupled to a buffering spring hook, whereby when controlling the dog having a habit of pulling an owner, without intervention of the main lead and the lead buffering spring, the control lead hand coupled to the control lead is used, and thereby, without applying a sudden force to the lead buffering spring, the spring is not fully extended.

* * * * *